(12) United States Patent
Lo et al.

(10) Patent No.: US 12,640,944 B2
(45) Date of Patent: May 26, 2026

(54) SELF-TIMED READOUT DRIVER FOR LEAKAGE-BASED PHYSICAL UNCLONABLE FUNCTION (L-PUF) DEVICE, L-PUF ARRAY USING SAME, AND APPLICATIONS THEREOF

(71) Applicant: Jmem Technology Co., Ltd., Taipei (TW)

(72) Inventors: Yu-Chen Lo, Taipei (TW); Chun-Hao Liang, Taipei (TW); Dong-Yu Wu, Taipei (TW); Tsung-Han Lu, Taipei (TW); Meng-Lin Wu, Taipei (TW)

(73) Assignee: JMEM TECHNOLOGY CO., LTD., Taipei (TW)

( * ) Notice: Subject to any disclaimer, the term of this patent is extended or adjusted under 35 U.S.C. 154(b) by 145 days.

(21) Appl. No.: 18/791,818

(22) Filed: Aug. 1, 2024

(65) Prior Publication Data

US 2025/0047513 A1 Feb. 6, 2025

Related U.S. Application Data

(60) Provisional application No. 63/530,952, filed on Aug. 5, 2023.

(51) Int. Cl.

| | |
|---|---|
| ***H04L 9/32*** | (2006.01) |
| ***G11C 7/06*** | (2006.01) |
| ***G11C 7/12*** | (2006.01) |

(52) U.S. Cl.

CPC ............ *H04L 9/3278* (2013.01); *G11C 7/062* (2013.01); *G11C 7/065* (2013.01); *G11C 7/12* (2013.01); *H04L 2209/12* (2013.01)

(58) Field of Classification Search

CPC . H04L 9/0866; H04L 9/3278; H04L 2209/12; G11C 7/06; G11C 7/062; G11C 7/065; G11C 7/12; G11C 7/24; G06F 21/70; G06F 21/71; G06F 21/72; G06F 21/73; G06F 12/14

See application file for complete search history.

(56) References Cited

U.S. PATENT DOCUMENTS

| | | | | |
|---|---|---|---|---|
| 10,685,700 B2 * | 6/2020 | Royer | .................... | G11C 5/147 |
| 11,195,576 B2 * | 12/2021 | Kumar | .................... | G11C 7/08 |
| 2014/0204683 A1 * | 7/2014 | Sahu | .................... | G11C 7/08 365/189.11 |

(Continued)

*Primary Examiner* — Jason M Crawford

(74) *Attorney, Agent, or Firm* — troutman pepper locke; Tim Tingkang Xia, Esq.

(57) ABSTRACT

A self-timed readout driver for a leakage-based physical unclonable function (L-PUF) device, a L-PUF array using the same, and applications thereof are provided. The self-timed readout driver includes a precharge transistor, an inverter and a leaky device. The precharge transistor has a control end, a first end and a second end. The inverter is electrically connected to the second end of the precharge transistor. The leaky device having a control end electrically connected to ground, a first end electrically connected to the second end of the precharge transistor, and a second end electrically connected to ground. The control end of the precharge transistor is configured to receive an input signal. The inverter is configured to generate a sense enable (SE) signal. The input signal and the SE signal may be used as two input signals for the L-PUF device.

20 Claims, 11 Drawing Sheets

(56) References Cited

U.S. PATENT DOCUMENTS

| | | | | |
|---|---|---|---|---|
| 2015/0236698 | A1* | 8/2015 | Pedersen | H03K 19/00384 326/8 |
| 2018/0102163 | A1* | 4/2018 | Lin | G09C 1/00 |
| 2019/0058603 | A1* | 2/2019 | Lin | H04L 9/0866 |
| 2019/0130103 | A1* | 5/2019 | Shen | H04L 9/3278 |
| 2019/0165956 | A1* | 5/2019 | Adham | H04L 9/0866 |
| 2020/0020364 | A1* | 1/2020 | Tsai | G06F 21/73 |
| 2021/0218583 | A1* | 7/2021 | Adham | G06F 21/73 |
| 2021/0248275 | A1* | 8/2021 | Lee | H04L 9/0866 |
| 2021/0250187 | A1* | 8/2021 | Lu | H04L 9/0866 |
| 2024/0413100 | A1* | 12/2024 | Lin | H10D 84/856 |
| 2025/0047512 | A1* | 2/2025 | Lo | G11C 7/065 |
| 2025/0047513 | A1* | 2/2025 | Lo | G11C 11/419 |
| 2025/0079343 | A1* | 3/2025 | Pritchard | G09C 1/00 |

* cited by examiner

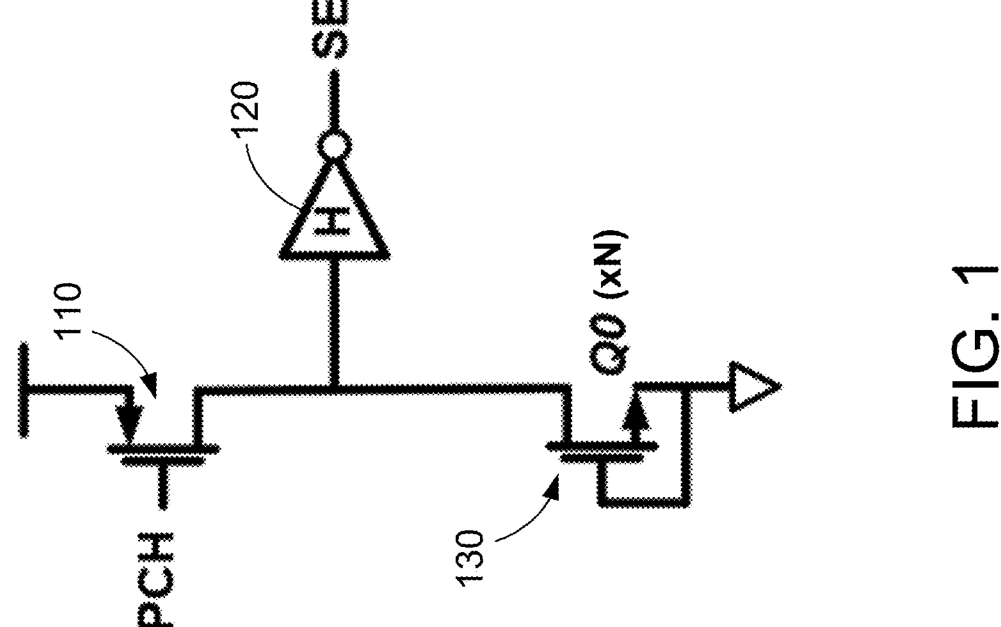
FIG. 1
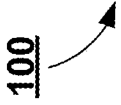

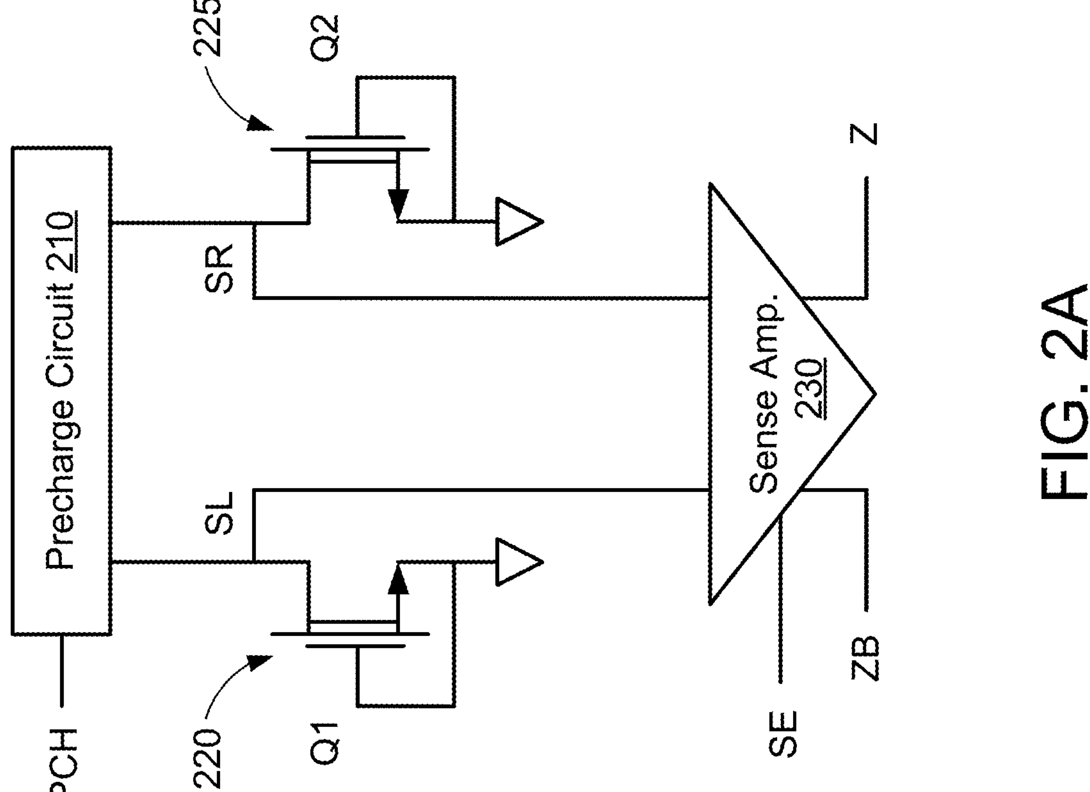
FIG. 2A

State0: (Z, ZB) = (0, 1)

V(PCH)

$V_{Core}$

V(SE)

$V_{Core}$

V(SR)
V(SL)

$V_{diff}$

State1: (Z, ZB) = (1, 0)

V(PCH)

$V_{Core}$

V(SE)

$V_{Core}$

V(SL)
V(SR)

$V_{diff}$

SELF-TIMED READOUT DRIVER FOR LEAKAGE-BASED PHYSICAL UNCLONABLE FUNCTION (L-PUF) DEVICE, L-PUF ARRAY USING SAME, AND APPLICATIONS THEREOF

CROSS-REFERENCE TO RELATED PATENT APPLICATION

This non-provisional application claims priority to and the benefit of, pursuant to 35 U.S.C. § 119 (c), U.S. Provisional Application Ser. No. 63/530,952 filed Aug. 5, 2023. The disclosure of the above application is incorporated herein in its entirety by reference.

FIELD OF THE INVENTION

The present invention relates generally to physical unclonable function (PUF) technology, and more particularly to a self-timed readout driver for a leakage-based PUF (L-PUF), a L-PUF array using the same, and applications thereof.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

A physical unclonable function (PUF) is a physical object whose operation cannot be reproduced (i.e., "cloned") in a physical way (by making another system using the same technology), that for a given input and conditions, provides a physically defined "digital fingerprint" output (response). PUFs are a class of cryptographic primitives that exploit physical variations in hardware devices to generate unique and unpredictable keys for secure authentication and identification purposes. In particular, PUFs provide a tamper-proof solution for key generation by exploiting the inherent randomness in manufacturing variations, thus eliminating the need for traditional storage and management of secret keys. Specifically, a leakage-based PUF (L-PUF) has large sensitivity to process variation. However, it is also difficult to determine the time to readout data due to the large dynamic range of leakage current.

Therefore, a heretofore unaddressed need exists in the art to address the aforementioned deficiencies and inadequacies.

SUMMARY OF THE INVENTION

Certain aspects of the present invention relate to a self-timed readout driver for a leakage-based physical unclonable function (L-PUF) device. In one aspect, the self-timed readout driver includes a precharge transistor, an inverter and a leaky device. The precharge transistor has a control end, a first end and a second end. The inverter is electrically connected to the second end of the precharge transistor. The leaky device having a control end electrically connected to ground, a first end electrically connected to the second end of the precharge transistor, and a second end electrically connected to ground. The control end of the precharge transistor is configured to receive an input signal. The inverter is configured to generate a sense enable (SE) signal.

In certain embodiments, the input signal and the SE signal are configured as two input signals for the L-PUF device.

In certain embodiments, the L-PUF device includes a precharge circuit, a first leaky device and a second leaky device, and a sense amplifier. The precharge circuit is configured to receive the input signal. The first leaky device and the second leaky device are electrically connected to the precharge circuit respectively. Each of the first leaky device and the second leaky device includes a transistor having a control end electrically connected to ground, a first end electrically connected to the precharge circuit and a second end electrically connected to ground. The sense amplifier is electrically connected to the first end of the first leaky device and the first end of the second leaky device. The sense amplifier is configured to receive the SE signal and to generate a first output signal and a second output signal. The sense amplifier is configured to switch between a first state and a second state based on a voltage difference between the first leaky device and the second leaky device, and the voltage difference between the first leaky device and the second leaky device is determined by a leakage current of the first leaky device and a leakage current of the second leaky device.

In certain embodiments, the leaky device is a N-repeated leaky device, and the N-repeated leaky device is configured to leak faster than the first leaky device and the second leaky device of the L-PUF device.

In certain embodiments, the sense amplifier includes: a first transistor having a control end configured to receive the SE input signal, a first end, and a second end electrically connected to ground; a second transistor having a control end electrically connected to the first end of the transistor of the first leaky device, a first end, and a second end configured to generate the first output signal; a third transistor having a control end electrically connected to the first end of the transistor of the first leaky device, a first end electrically connected to the second end of the second transistor, and a second end electrically connected to the first end of the first transistor; a fourth transistor having a control end electrically connected to the first end of the transistor of the second leaky device, a first end, and a second end configured to generate the second output signal; and a fifth transistor having a control end electrically connected to the first end of the transistor of the second leaky device, a first end electrically connected to the second end of the fourth transistor, and a second end electrically connected to the first end of the first transistor. The second end of the second transistor and the first end of the third transistor are electrically connected to the first end of the transistor of the second leaky device, and the second end of the fourth transistor and the first end of the fifth transistor are electrically connected to the first end of the transistor of the first leaky device.

In certain embodiments, the L-PUF device further includes: a first switch electrically connected to the second end of the second transistor; and a second switch electrically connected to the second end of the fourth transistor.

In certain embodiments, the first switch and the second switch are respectively controlled by the input signal.

In another aspect, an L-PUF array includes a plurality of L-PUF cells in an array, a plurality of input signal lines, a plurality of output signal lines and a plurality of control circuits. Each of the L-PUF cells includes a respective L-PUF device. The input signal lines respectively extend along a first direction and are electrically connected to the L-PUF cells correspondingly. Each of the input signal lines is configured to transmit one of two input signals to a first corresponding set of the L-PUF cells. The output signal lines respectively extend along a second direction and are electrically connected to the L-PUF cells correspondingly. Each of the output signal lines is configured to receive output signals from a second corresponding set of the L-PUF cells. The control circuits are electrically connected to the input signal lines to provide the two input signals to the L-PUF cells through the input signal lines. Each of the control circuits includes the self-timed readout driver as described above, and the input signal and the SE signal generated by the self-timed readout driver are configured as the two input signals for the L-PUF cells.

In certain embodiments, one of the first direction and the second direction is a row direction, and the other of the first direction and the second direction is a column direction.

In certain embodiments, the L-PUF device includes a precharge circuit, a first leaky device and a second leaky device. The first leaky device and the second leaky device are electrically connected to the precharge circuit respectively. Each of the first leaky device and the second leaky device includes a transistor having a control end electrically connected to ground, a first end electrically connected to the precharge circuit and a second end electrically connected to ground. A first intermediate output signal is determined based on a decreased voltage of the first leaky device, and a second intermediate output signal is determined based on a decreased voltage of the second leaky device.

In certain embodiments, the leaky device is a N-repeated leaky device, and the N-repeated leaky device is configured to leak faster than the first leaky device and the second leaky device of the L-PUF device.

In certain embodiments, the L-PUF device further a first switch electrically connected to the first end of the transistor of the first leaky device; and a second switch electrically connected to the first end of the transistor of the second leaky device. The first switch, when controlled to switch to an ON state, is configured to transmit the first intermediate output signal, and the second switch, when controlled to switch to an ON state, is configured to transmit the second intermediate output signal.

In yet a further aspect, an L-PUF array includes a plurality of L-PUF cells in an array, a plurality of input signal lines, a plurality of output signal lines, a plurality of sense amplifiers, and a control circuit. Each of the L-PUF cells includes a respective L-PUF device. The input signal lines respectively extend along a first direction and are electrically connected to the L-PUF cells correspondingly. The output signal lines respectively extend along a second direction and are electrically connected to the L-PUF cells correspondingly. The sense amplifiers are electrically connected to one of the input signal lines and the output signal lines respectively. The input signal lines are configured to transmit two input signals to the sense amplifiers and the L-PUF cells. The control circuit is electrically connected to the one of the input signal lines to provide one of the two input signals to the sense amplifiers through the one of the input signal lines. The control circuit includes the self-timed readout driver as described above, and the SE signal generated by the self-timed readout driver is configured as the one of the two input signals transmitted to the sense amplifiers.

In certain embodiments, each of the sense amplifiers is configured to receive the first intermediate output signal and the second intermediate output signal transmitted by the second corresponding set of the L-PUF cells through the output signal lines, and to generate an output signal based on the first intermediate output signal and the second intermediate output signal.

In certain embodiments, one of the first direction and the second direction is a row direction, and the other of the first direction and the second direction is a column direction.

In certain embodiments, each of the sense amplifiers includes a first stage pre-amplifier and a second stage latch.

In yet a further aspect, a secure authentication device is provided, which includes the L-PUF array as described above. In one embodiment, the secure authentication device is a secure cryptographic key generation device.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 1 shows schematically an exemplary self-timed readout driver for a L-PUF device according to one embodiment of the present invention.

FIG. 2A shows schematically an exemplary L-PUF device according to one embodiment of the present invention.

FIG. 2B shows an operation of the exemplary L-PUF device as shown in FIG. 2A at a first state S0 with the output (Z, ZB)=(0,1).

FIG. 2C shows an operation of the exemplary L-PUF device as shown in FIG. 2A at a second state S1 with the output (Z, ZB)=(1,0).

DETAILED DESCRIPTION OF THE INVENTION

Figure 3:
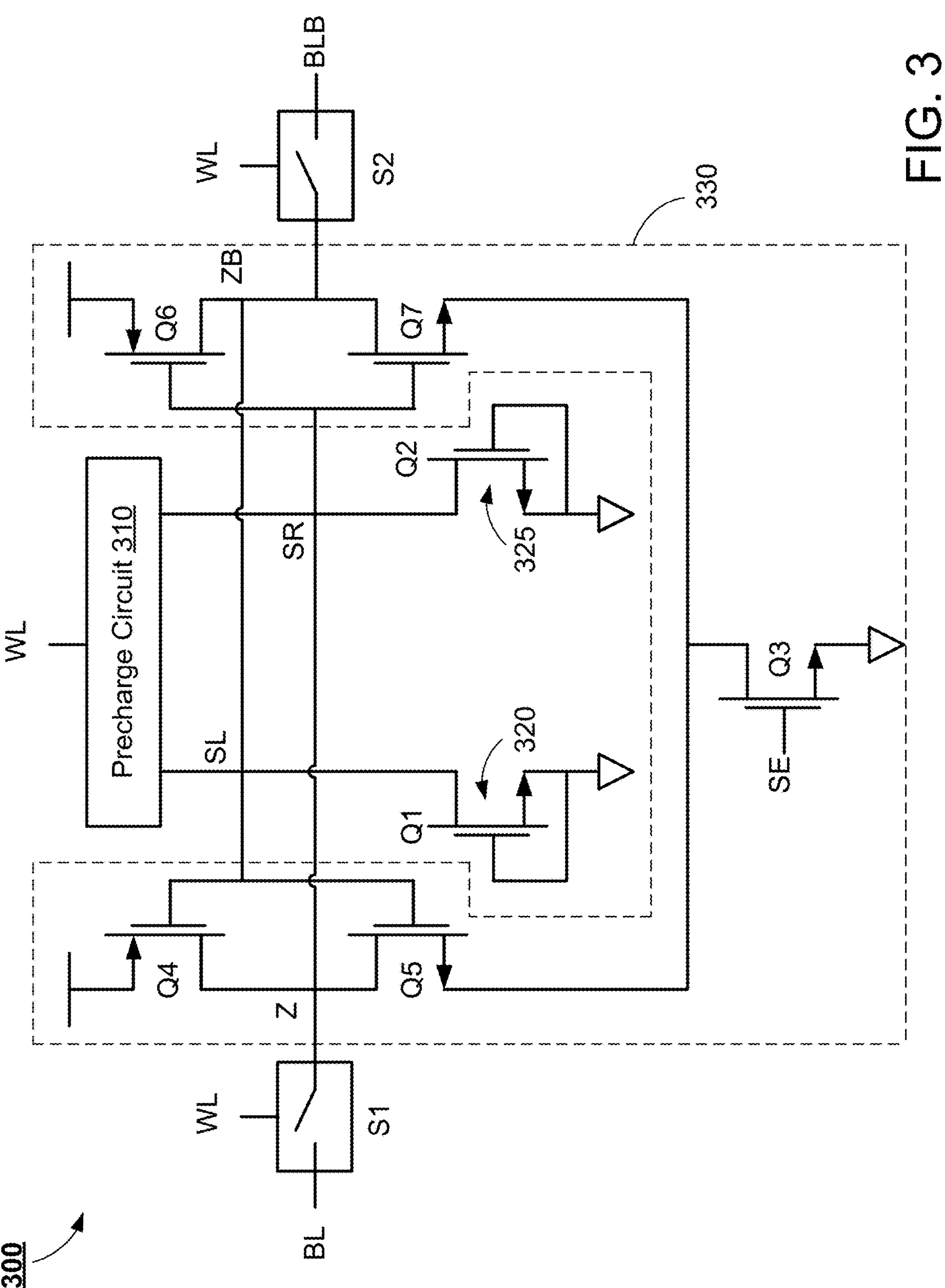
FIG. 3 shows schematically an exemplary L-PUF device according to another embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

The term "leaky device" as used herein is formed by a transistor for implementing a corresponding leakage function, which is the subthreshold region of the transistor. Specifically, while the gate and the source node of the transistor are electrically connected together, the transistor would be bias in the subthreshold region, and the current induced by the subthreshold region is a "leakage current" which is relatively smaller than the current induced by other regions.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, an L-PUF has large sensitivity to process variation. However, it is also difficult to determine the time to readout data due to the large dynamic range of leakage current. In view of this, certain aspects of the present invention relate to a self-timed readout driver for a L-PUF, which may be used for timing control of the L-PUF. In certain embodiments, the self-timed readout driver has a simple N-repeated leaky device, allowing the leakage of the leaky device to be faster than the leaky devices of the L-PUF device, thereby ensuring a quicker discharge of the sense enable signal. In one embodiment, the proposed self-timed readout driver for L-PUF may offer a novel solution for improving the security of hardware systems, and the ability of the self-timed readout driver to self-time and accommodate process variations ensures the reliable and efficient functioning of the system, making it a promising area for future research and development.

FIG. 1 shows schematically an exemplary self-timed readout driver for a L-PUF device according to one embodiment of the present invention. As shown in FIG. 1, the self-timed readout driver 100 includes a precharge transistor 110, an inverter 120 and a leaky device 130. The precharge transistor 110 has a control end, a first end and a second end. The inverter 120 may be a high-skewed inverter, which is electrically connected to the second end of the precharge transistor 110, and is used to generate a sense enable (SE) signal as an input signal for the L-PUF device. In certain embodiments, the leaky device 130 may be a N-repeated leaky device Q0 (xN). Alternatively, in certain embodiments, the leaky device 130 may be a leaky device Q0 without repeats. Specifically, the leaky device 130 has a control end electrically connected to ground, a first end electrically connected to the second end of the precharge transistor 110, and a second end electrically connected to ground. In other words, the control end (i.e., gate) and the second end (i.e., source) of the leaky device 130 are electrically connected to each other. The control end of the precharge transistor 110 is configured to receive an input signal PCH, which may also be another input signal for the L-PUF device.

When the self-timed readout driver 100 is in operation, the presence of N replicas in Q0 allows it to leak faster than the leaky devices in the L-PUF device, ensuring a quicker discharge of the SE signal. The high-skewed inverter 120 then responds rapidly to the voltage drop and pulls up the SE signal, which ensures that the SE signal is able to accommodate process variation and is pulled up earlier than the voltage difference of the leaky devices of the L-PUF device to reach the threshold voltage.

Figure 2B:
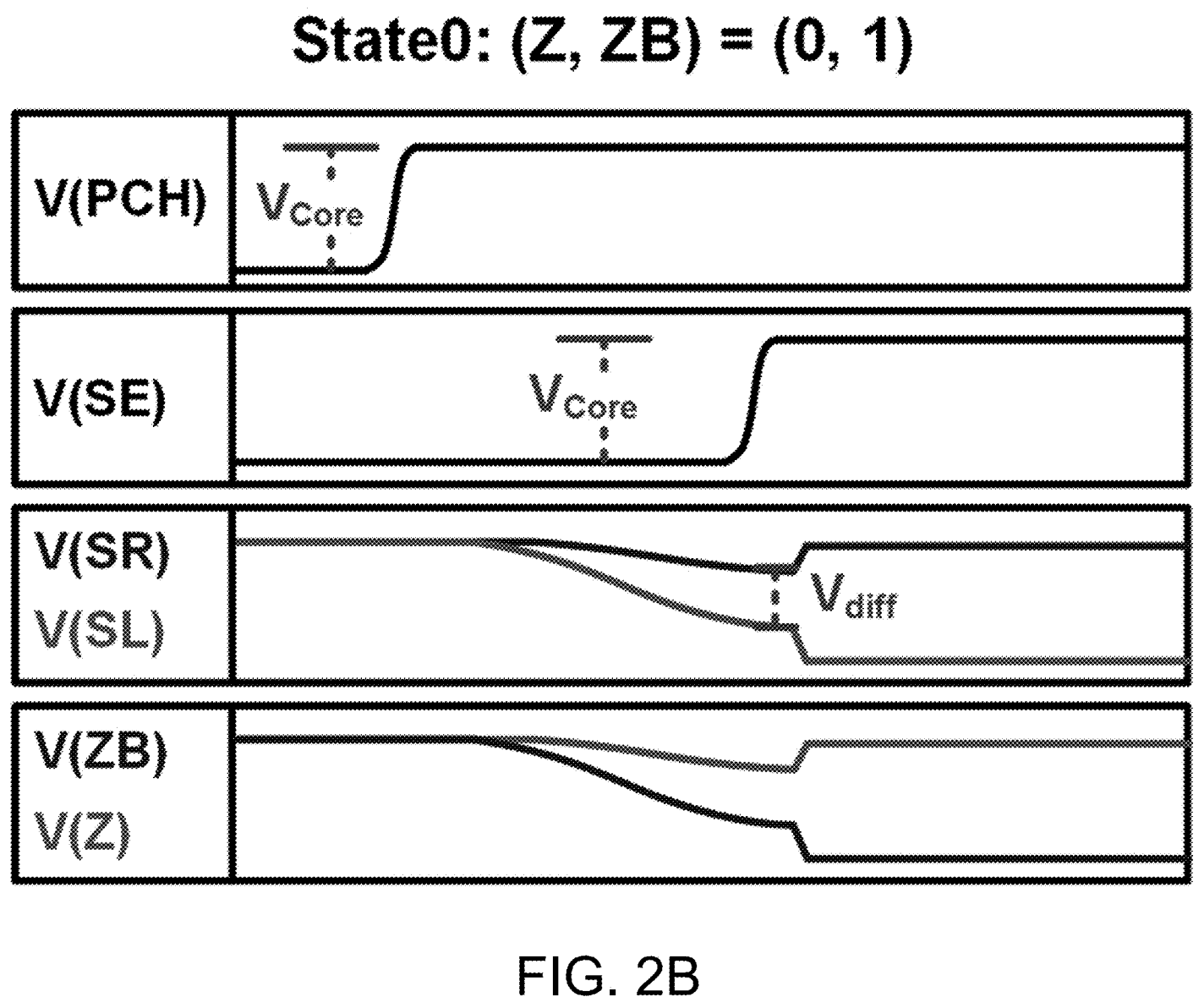

FIG. 2A shows schematically an exemplary L-PUF device according to one embodiment of the present invention. Specifically, the L-PUF device 200 as shown in FIG. 2A mainly includes a precharge circuit 210, two leaky devices 220 (Q1) and 225 (Q2), and a sense amplifier 230. For clarity purposes, the two leaky devices 220 and 225 are referred to as a first leaky device Q1 and a second leaky device Q2. As shown in FIG. 2A, each of the first leaky device Q1 and the second leaky device Q2 includes a transistor. Specifically, the transistor of each leaky device Q1 and Q2 has a control end electrically connected to ground, a first end electrically connected to the precharge circuit 210, and a second end electrically connected to ground. In other words, for each of the first leaky device Q1 and the second leaky device Q2, the control end (i.e., the gate) and the second end (i.e., the source) are electrically connected to each other. In particular, the first end of the transistor of the first leaky device Q1 is electrically connected to a node SL, which is electrically connected to the precharge circuit 210; and the first end of the transistor of the second leaky device Q2 is electrically connected to a node SR, which is electrically connected to the precharge circuit 210.

The sense amplifier 230 is electrically connected to the first end of the first leaky device Q1 and the first end of the second leaky device Q2. In particular, the L-PUF device 200 has two input signals SE and PCH and generates two output signals Z and ZB. Specifically, the sense amplifier 230 receives an input signal SE, which is generated by the self-timed readout driver 100 as shown in FIG. 1, and correspondingly generates a first output signal Z and a second output signal ZB. The precharge circuit 210 receives another input signal PCH, which is the same input signal for the precharge transistor 110 of the self-timed readout driver 100 as shown in FIG. 1.

As shown in FIG. 2A, in the L-PUF device 200, leakage currents of the first leaky device Q1 and the second leaky device Q2 are dependent to the threshold voltage (Vth). Specifically, an exponential relationship that leads to large dynamic range considering process variation is shown in Equation (1) as follows.

$$I_{leak} \propto e^{-V_{th}} \quad (1)$$

In the L-PUF device 200, the sense amplifier 230 may switch between a first state and a second state based on a voltage difference between the first leaky device Q1 and the second leaky device Q2, and the voltage difference between the first leaky device Q1 and the second leaky device Q2 is determined by the leakage currents of the first leaky device Q1 and the second leaky device Q2.

Figure 2C:
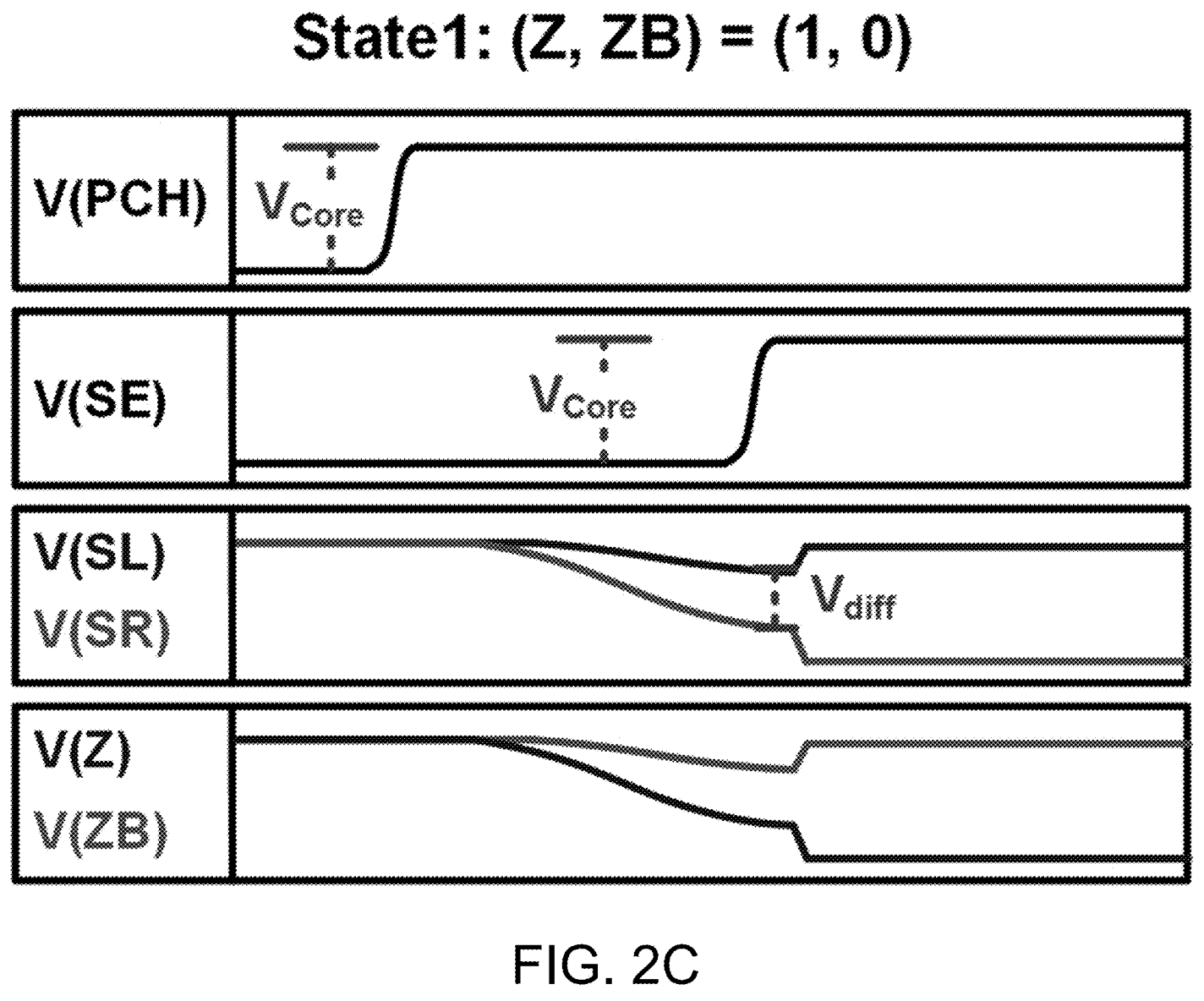

FIG. 2B shows an operation of the exemplary L-PUF device as shown in FIG. 2A at a first state S0 with the output (Z, ZB)=(0,1), and FIG. 2C shows an operation of the exemplary L-PUF device as shown in FIG. 2B at a second state S1 with the output (Z, ZB)=(1,0). Specifically, as shown in FIGS. 2B and 2C, at the start of the operation process of the L-PUF device 200, the precharge circuit 210, which receives the input signal PCH as its input, starts the pre-charging process with the input signal PCH at a low voltage level, and pre-charges the nodes SL and SR to a high voltage level. Meanwhile, the precharge transistor 110 of the self-timed readout driver 100 also receives the input signal PCH, and is also precharged. At this time, the self-timed readout driver 100 has not generated the SE signal. Thus, the input signal SE for the sense amplifier 230 remains deactivated at the low voltage level.

Subsequently, the input signal PCH is activated (i.e., at a high voltage level $V_{core}$) to disable the precharge circuit 210 of the L-PUF device 200, and to allow the self-timed readout driver 100 to transition into a self-timed mode of operation. In particular, at the self-timed readout driver 100, the presence of N replicas in the leaky device Q0 allows it to leak faster than the leaky devices Q1 and Q2 in the L-PUF device 200, ensuring a quicker discharge of the SE signal by the inverter 120. The high-skewed inverter 120 then responds rapidly to the voltage drop and pulls up the SE signal.

Meanwhile, at the L-PUF device 200, with the two nodes SL and SR reaching the high voltage level, the two leaky devices Q1 and Q2 start functioning, with the leakage current of one of the two leaky devices being greater than the leakage current of the other leaky device. For example, as shown in FIG. 2B, when the leakage current of the first leaky device Q1 is greater than the leakage current of the second leaky device Q2, the voltage on the node SL, which is connected to the first end of the transistor of the first leaky device Q1, will decrease faster than the voltage on the node SR, which is connected to the first end of the transistor of the second leaky device Q2. This difference in voltage drop is a result of the inherent variability of the manufacturing process, which makes it impossible to precisely replicate the same design from one chip to another. Once this voltage difference between the two leaky devices Q2 and Q1 exceeds a certain threshold (i.e., $V_{diff}$), the sense amplifier 130 is enabled and switched to the first state (i.e., state 0), allowing the two output signals (Z, ZB) to be read out as (0, 1).

On the other hand, as shown in FIG. 2C, when the leakage current of the second leaky device Q2 is greater than the leakage current of the first leaky device Q1, the voltage on the node SR, which is connected to the first end of the transistor of the second leaky device Q2, will decrease faster than the voltage on the node SL, which is connected to the first end of the transistor of the first leaky device Q1. Once this voltage difference between the two leaky devices Q1 and Q2 exceeds a certain threshold (i.e., $V_{diff}$), the sense amplifier 130 is enabled and switched to the second state (i.e., state 1), allowing the two output signals (Z, ZB) to be read out as (1, 0).

In certain embodiments, the respective thresholds of the voltage difference between the two leaky devices Q1 and Q2 as shown in FIGS. 2B and 2C may be of the same absolute value (i.e., $V_{diff}$). In other words, FIG. 2B shows that $V(SR)-V(SL)=V_{diff}$, and FIG. 2C shows that $V(SL)-V(SR)=V_{diff}$. Alternatively, in certain embodiments, the thresholds of the voltage difference between the two leaky devices Q1 and Q2 as shown in FIGS. 2B and 2C may be of different absolute values.

With the structure of the self-timed readout driver 100 as shown in FIG. 1, it is ensured that the SE signal is able to accommodate process variation and is pulled up earlier than the voltage difference of the nodes SL and SR to reach the threshold voltage.

It should be noted that the output signals of the L-PUF device 200 are unique to each individual L-PUF, and are determined by the specific characteristics of the leaky devices Q1 and Q2 that make up the circuit. By exploiting this inherent variability, L-PUFs can be used for secure cryptographic key generation and other applications that require secure authentication.

The outputs of the L-PUF device are unique to each individual L-PUF and are determined by the specific characteristics of the leaky devices Q1 and Q2 that make up the circuit. By exploiting this inherent variability, L-PUFs can be used for secure cryptographic key generation and other applications that require secure authentication.

FIG. 3 shows schematically an exemplary L-PUF device according to another embodiment of the present invention. Specifically, the L-PUF device 300 as shown in FIG. 3 is a detailed version of the L-PUF device 200, with the circuitry of the sense amplifier 330 being described with the implementation of 5 transistors. As shown in FIG. 3, the L-PUF device 300 includes a precharge circuit 310, two leaky devices 320 (Q1) and 325 (Q2), and a sense amplifier 330. For clarity purposes, the two leaky devices 320 and 325 are referred to as a first leaky device Q1 and a second leaky device Q2. As shown in FIG. 3, each of the first leaky device Q1 and the second leaky device Q2 includes a transistor. Specifically, the transistor of each leaky device Q1 and Q2 has a control end electrically connected to ground, a first end electrically connected to the precharge circuit 310, and a second end electrically connected to ground. In other words, for each of the first leaky device Q1 and the second leaky device Q2, the control end (i.e., the gate) and the second end (i.e., the source) are electrically connected to each other. In particular, the first end of the transistor of the first leaky device Q1 is electrically connected to a node SL, which is electrically connected to the precharge circuit 310; and the first end of the transistor of the second leaky device Q2 is electrically connected to a node SR, which is electrically connected to the precharge circuit 310.

Further, the sense amplifier 330 includes a first transistor Q3, a second transistor Q4, a third transistor Q5, a fourth transistor Q6 and a fifth transistor Q7. The first transistor Q3 has a control end configured to receive the input signal SE (which is generated by the inverter 120 of the self-timed readout driver 100), a first end electrically connected to the second end of the third transistor Q5 and the second end of the fifth transistor Q7, and a second end electrically connected to ground. The second transistor Q4 and the third transistor Q5 are provided to correspond to the first leaky device Q1, with the second transistor Q4 having a control end electrically connected to the node SL (which is electrically connected to the first end of the transistor of the first leaky device Q1), a first end, and a second end configured to generate a corresponding output signal Z; and the third transistor Q5 having a control end electrically connected to the node SL (which is electrically connected to the first end of the transistor of the first leaky device Q1), a first end electrically connected to the second end of the second transistor Q4, and a second end electrically connected to the first end of the first transistor Q3. In addition, the second end of the second transistor Q4 and the first end of the third transistor Q5 are electrically connected to the node SR, which is electrically connected to the first end of the transistor of the second leaky device Q2. In other words, the output signal Z is the signal at the node SR. The fourth transistor Q6 and the fifth transistor Q7 are provided to correspond to the second leaky device Q2, with the fourth transistor Q6 having a control end electrically connected to the node SR (which is electrically connected to the first end of the transistor of the second leaky device Q2), a first end, and a second end configured to generate a corresponding output signal ZB; and the fifth transistor Q7 having a control end electrically connected to the node SR (which is electrically connected to the first end of the transistor of the second leaky device Q2), a first end electrically connected to the second end of the fourth transistor Q6, and a second end electrically connected to the first end of the first transistor Q3. In addition, the second end of the fourth transistor Q6 and the first end of the fifth transistor Q7 are electrically connected to the node SL, which is electrically connected to the first end of the transistor of the first leaky device Q1. In other words, the output signal ZB is the signal at the node SL.

Moreover, as shown in FIG. 3, the L-PUF device 300 further includes a first switch S1 electrically connected to the second end of the second transistor Q4 in order to transmit the output signal Z as a first output signal BL when the first switch S1 is in an ON state, and a second switch S2 electrically connected to the second end of the fourth transistor Q6 in order to transmit the output signal ZB as a second output signal BLB when the second switch S2 is in an ON state. Both the first switch S1 and the second switch S2 may be controlled by another input signal WL, which is also the input signal for the precharge circuit 310.

In the L-PUF device 300, the sense amplifier 330 may switch between a first state and a second state based on a voltage difference between the first leaky device Q1 and the second leaky device Q2, and the voltage difference between the first leaky device Q1 and the second leaky device Q2 is determined by the leakage currents of the first leaky device Q1 and the second leaky device Q2.

Figure 4:
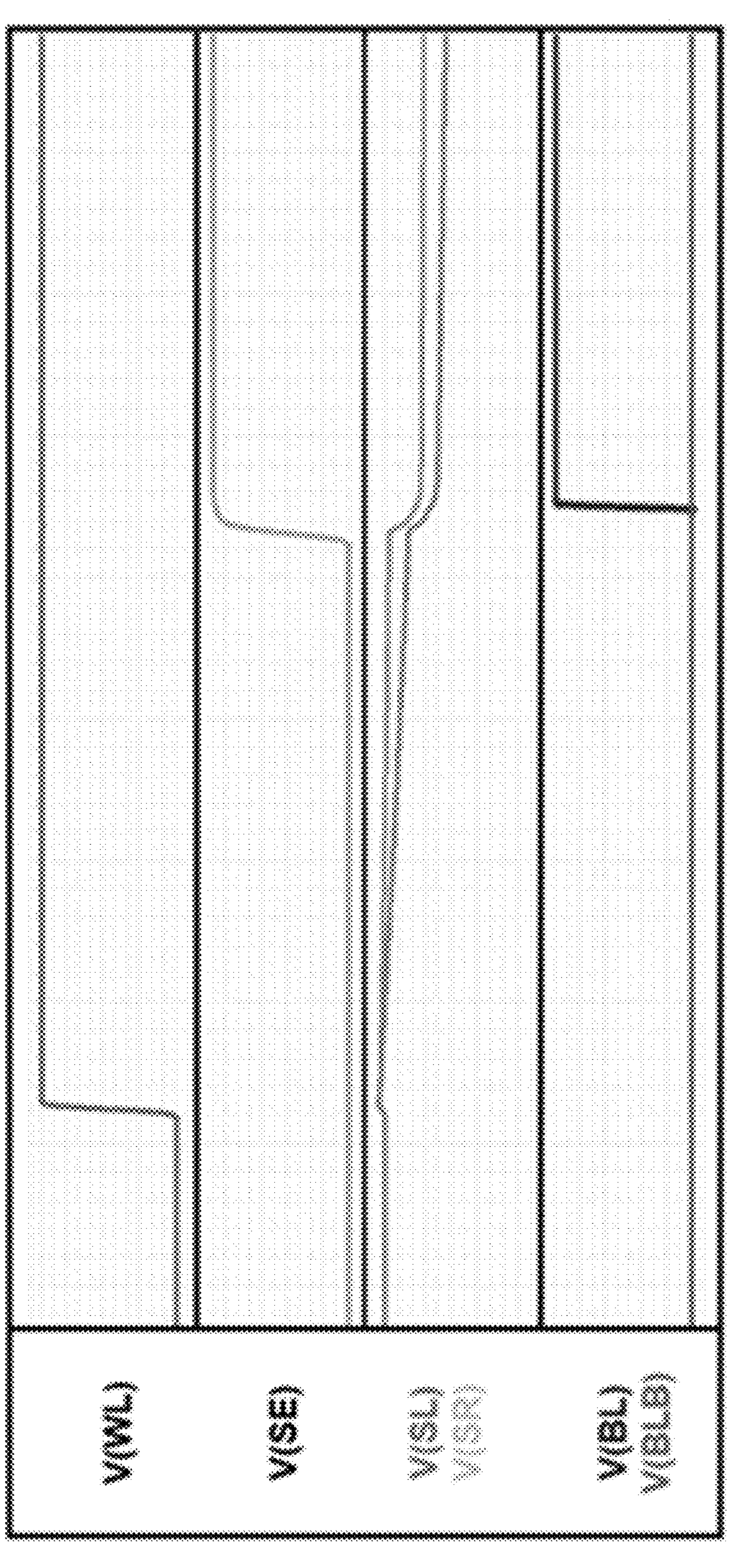
FIG. 4 shows an operation of the exemplary L-PUF device as shown in FIG. 3 at a state with the output (BL, BLB)=(1,0).

FIG. 4 shows an operation of the exemplary L-PUF device as shown in FIG. 3 at a state with the output (BL, BLB)=(1,0). Specifically, as shown in FIG. 4, at the start of the operation process of the L-PUF device 300, the pre-charge circuit 310, which receives the input signal WL as its input, starts the pre-charging process with the input signal WL at a low voltage level, and pre-charges the nodes SL and SR to a high voltage level. Meanwhile, the precharge transistor 110 of the self-timed readout driver 100 also receives the input signal PCH, and is also precharged. At this time, the input signal SE for the sense amplifier 330 remains deactivated at the low voltage level.

Subsequently, the input signal WL is activated (i.e., at a high voltage level) to disable the precharge circuit 310. Meanwhile, the input signal PCH to the precharge transistor 110 allows the self-timed readout driver 100 to transition into a self-timed mode of operation. In particular, at the self-timed readout driver 100, the presence of N replicas in the leaky device Q0 allows it to leak faster than the leaky devices Q1 and Q2 in the L-PUF device 300, ensuring a quicker discharge of the SE signal by the inverter 120. The high-skewed inverter 120 then responds rapidly to the voltage drop and pulls up the SE signal. At the L-PUF device 300, with the input signal WL being activated, at the same time, the two switches S1 and S2 are turned to the ON state, such that the nodes SL and SR are respectively connected to the output ends of the two switches S1 and S2 to generate the first output signal BL and the second output signal BLB. Meanwhile, with the two nodes SL and SR reaching the high voltage level, the two leaky devices Q1 and Q2 start functioning, with the leakage current of one of the two leaky devices being greater than the leakage current of the other leaky device. For example, as shown in FIG. 4, the leakage current of the first leaky device Q1 is greater than the leakage current of the second leaky device Q2, and the voltage on the node SL, which is connected to the first end of the transistor of the first leaky device Q1, will decrease faster than the voltage on the node SR, which is connected to the first end of the transistor of the second leaky device Q2. This difference in voltage drop is a result of the inherent variability of the manufacturing process, which makes it impossible to precisely replicate the same design from one chip to another. Once this voltage difference between the two leaky devices Q2 and Q1 exceeds a certain threshold (i.e., $V_{diff}$), the sense amplifier 330 is enabled and switched to the first state (i.e., state 0), allowing the two output signals (BL, BLB) to be read out as (1, 0).

Figure 5:
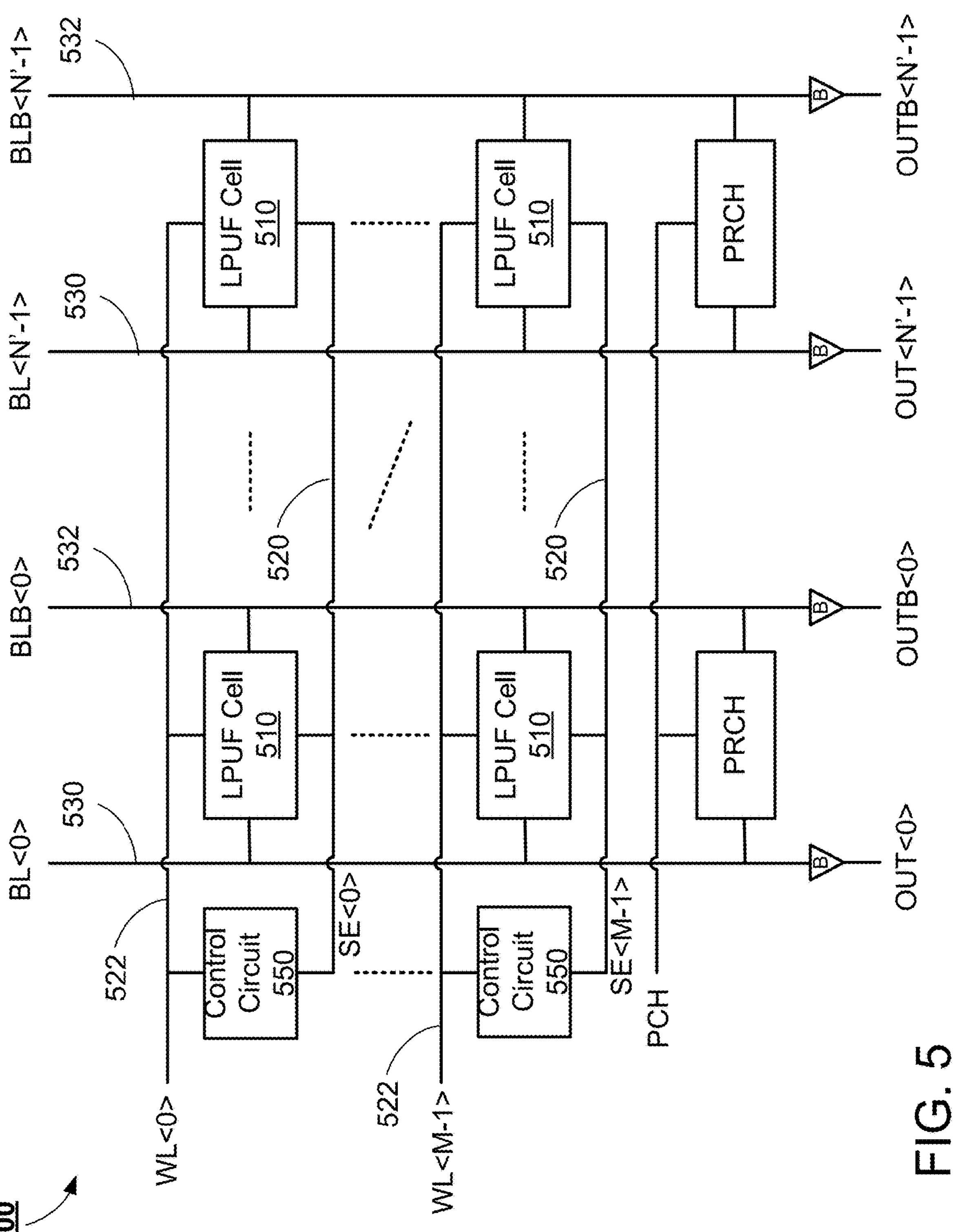
FIG. 5 shows schematically an exemplary L-PUF array formed by a plurality of L-PUF devices as shown in FIG. 3.

FIG. 5 shows schematically an exemplary L-PUF array formed by a plurality of L-PUF devices as shown in FIG. 3. Specifically, the L-PUF array 500 has an array size of (M×N'), including M rows and N' columns of L-PUF cells 510. For example, the L-PUF array 500 may be a 64×32 array with 64 rows and 32 columns. Each L-PUF cell 510 includes a L-PUF device 300 as shown in FIG. 3. Further, each row of the L-PUF array has a control circuit 550 controlling the input signals SE. Specifically, each control circuit 550 includes a respective self-timed readout driver 100 as shown in FIG. 1 to generate the corresponding input signal SE. Each control circuit 550 also receives the input signal WL. For clarity purposes, the M rows are labeled as row <0> to row <M−1>, the corresponding input signals SE for the M rows are labeled as SE<0> to SE<M−1>, and the corresponding input signals WL for the M rows are labeled as WL<0> to WL<M−1>.

In addition, the L-PUF array includes (M×2) input signal lines 520 and 522, and (N'×2) output signal lines 530 and 532. The input signal lines 520 and 522 respectively extend along a row direction, and the input signal lines 520 and 522 are electrically connected to the L-PUF cells 510 correspondingly. Specifically, the (M×2) input signal lines include M first input lines 520, which respectively extend along the row direction and electrically connected to the L-PUF cells 510 correspondingly, and M second input lines 522, which respectively extend along the row direction and electrically connected to the L-PUF cells 510 correspondingly. Each first input line 520 is used to transmit the input signal SE to the first corresponding set of the L-PUF cells 510, and each second input line 522 is used to transmit the input signal WL to the first corresponding set of the L-PUF cells 510. For example, in the first row <0>, the corresponding first input line 520 is used to transmit the input signal SE<0> to the first row <0> of the L-PUF cells 510, and the corresponding second input line 522 is used to transmit the input signal WL<0> to the first row <0> of the L-PUF cells 510. Similarly, in the M-th row <M−1>, the corresponding first input line 520 is used to transmit the input signal SE<M−1> to the M-th row <M−1> of the L-PUF cells 510, and the corresponding second input line 522 is used to transmit the input signal WL<M−1> to the M-th row <M−1> of the L-PUF cells 510. As shown in FIG. 5, the first input lines 520 and the second input lines 522 are alternately disposed along the column direction.

The output signal lines 530 and 532 respectively extend along a column direction, and the output signal lines 530 and 532 are electrically connected to the L-PUF cells 510 correspondingly. Specifically, the (N'×2) output signal lines include N' first output lines 530, which respectively extend along the column direction and electrically connected to the L-PUF cells 510 correspondingly, and N' second output lines 532, which respectively extend along the column direction and electrically connected to the L-PUF cells 510 correspondingly. Each first output line 530 is used to transmit the first output signal BL from the second corresponding set of the L-PUF cells 510, and each second output line 532 is used to transmit the second output signal BLB from the second corresponding set of the L-PUF cells 510. For clarity purposes, the N' columns are labeled as column <0> to column <N'−1>, the corresponding first output signals BL for the N' columns are labeled as BL<0> to BL<N'−1>, and the corresponding second output signals BLB for the N' columns are labeled as BLB<0> to BLB<N'−1>. For example, in the first column <0>, the corresponding first output line 530 is used to transmit the output signal OUT<0> (i.e., first output signal BL<0>) from the first column <0> of the L-PUF cells 510, and the corresponding second output line 532 is used to transmit the output signal OUTB<0> (i.e., second output signal BLB<0>) from the first column <0> of the L-PUF cells 510. Similarly, in the N'-th column <N'−1>, the corresponding first output line 530 is used to transmit the output signal OUT<N'−1> (i.e., first output signal BL<N'-1> from the N'-th column <N'−1> of the L-PUF cells 510, and the corresponding second output line 532 is used to transmit the output signal OUTB<N'−1> (i.e., second output signal BLB<N'−1>) to the N'-th column <N−1> of the L-PUF cells 510. As shown in FIG. 5, the first output lines 530 and the second output lines 532 are alternately disposed along the row direction. Further, each of the first output lines 530 and the second output lines 532 is connected to a buffer B to avoid output loading difference from the peripheral circuits.

As shown in FIG. 5, the input signal lines 520 and 522 extend along the row direction, and the output signal lines 530 and 532 extend along the column direction. Alternatively, in certain embodiments, the structures of the signal lines may be transversed, such that the input signal lines 520 and 522 extend along the column direction, and the output signal lines 530 and 532 extend along the row direction.

Figure 6:
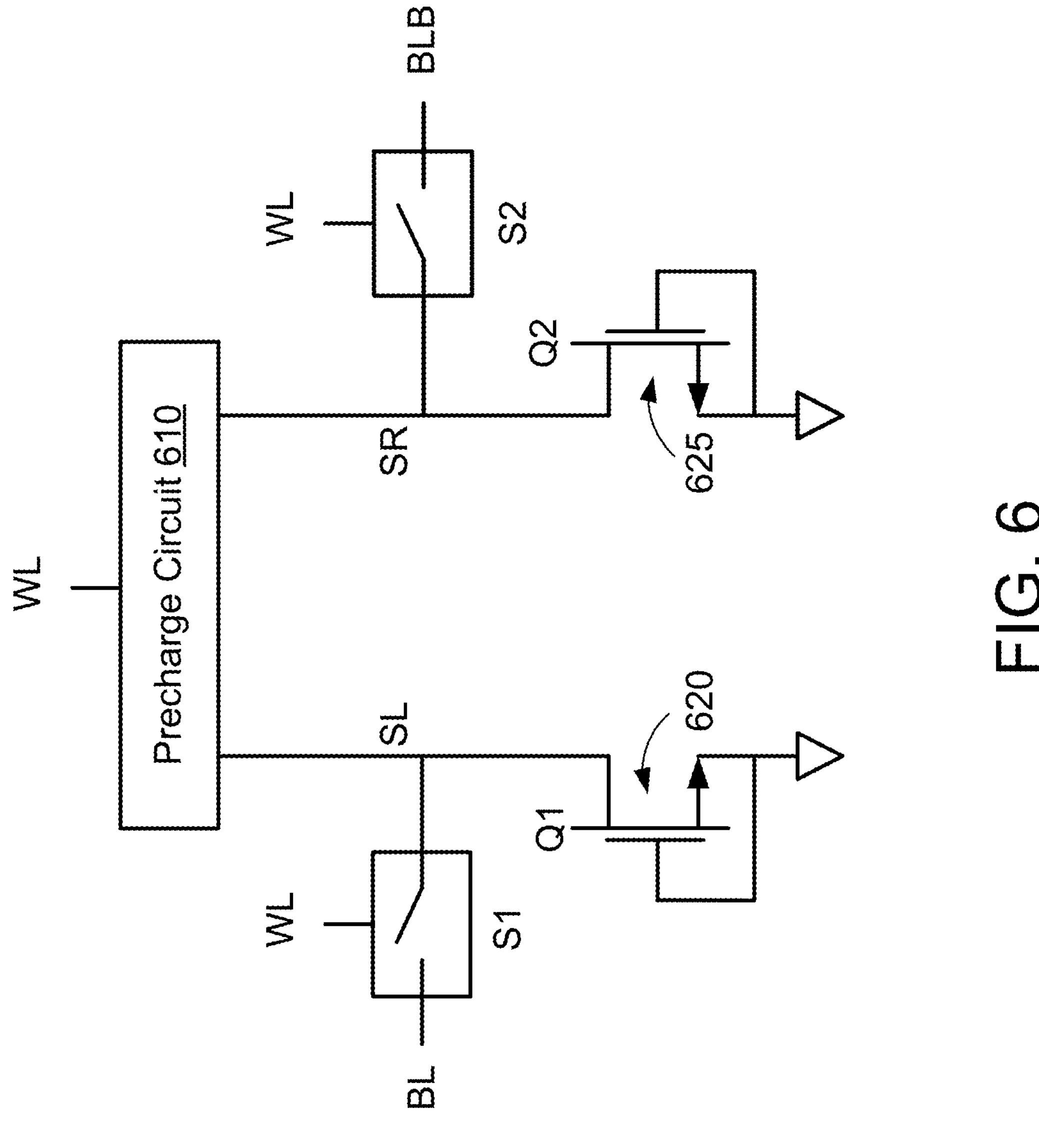
FIG. 6 shows schematically an exemplary L-PUF device according to a further embodiment of the present invention.

FIG. 6 shows schematically an exemplary L-PUF device according to a further embodiment of the present invention. Specifically, the L-PUF device 600 as shown in FIG. 6 is a L-PUF device with the sense amplifier being removed from each device. Instead, when the L-PUF device 600 is used in a L-PUF array, an additional sense amplifier is provided for a corresponding set of L-PUF cells. As shown in FIG. 6, the L-PUF device 600 includes a precharge circuit 610, two leaky devices 620 (Q1) and 625 (Q2), and two switches S1 and S2. For clarity purposes, the two leaky devices 620 and 625 are referred to as a first leaky device Q1 and a second leaky device Q2. As shown in FIG. 6, each of the first leaky device Q1 and the second leaky device Q2 includes a transistor. Specifically, the transistor of each leaky device Q1 and Q2 has a control end electrically connected to ground, a first end electrically connected to the precharge circuit 610, and a second end electrically connected to ground. In other words, for each of the first leaky device Q1 and the second leaky device Q2, the control end (i.e., the gate) and the second end (i.e., the source) are electrically connected to each other. In particular, the first end of the transistor of the first leaky device Q1 is electrically connected to a node SL, which is electrically connected to the precharge circuit 610; and the first end of the transistor of the second leaky device Q2 is electrically connected to a node SR, which is electrically connected to the precharge circuit 610. The two switches includes a first switch S1 electrically connected to the node SL, which is electrically connected to the first end of the transistor of the first leaky device Q1, in order to transmit a first intermediate output signal BL when the first switch S1 is in an ON state, and a second switch S2 electrically connected to the node SR, which is electrically connected to the first end of the transistor of the second leaky device Q2, in order to transmit a second intermediate output signal BLB when the second switch S2 is in an ON state. In other words, the intermediate output signals BL and BLB of the L-PUF device 600 no longer form the data output of the sense amplifier (as the sense amplifier is removed from the L-PUF device 600). Instead, the sense amplifier may be shared by one set (e.g., one column) of the L-PUF cells in a L-PUF array to decrease area and power lose in the previous version, and the intermediate output signals BL and BLB of the L-PUF device 600 serve as the input of the sense amplifier.

Figure 7:
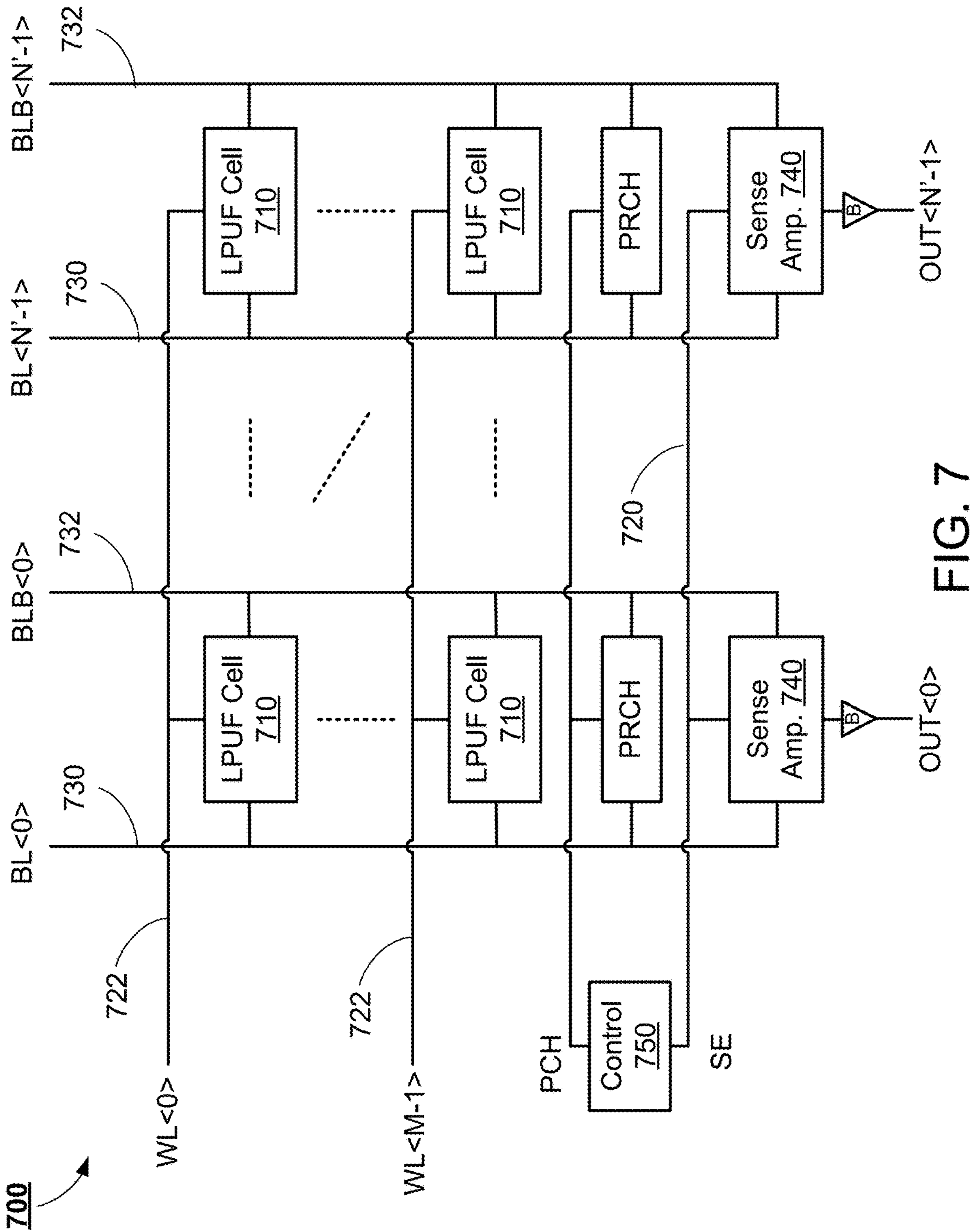
FIG. 7 shows schematically an exemplary L-PUF array formed by a plurality of L-PUF devices as shown in FIG. 6.

FIG. 7 shows schematically an exemplary L-PUF array formed by a plurality of L-PUF devices as shown in FIG. 6. Specifically, the L-PUF array 700 has an array size of (M×N'), including M rows and N' columns of L-PUF cells 710. For example, the L-PUF array 700 may be a 64×32 array with 64 rows and 32 columns. Each L-PUF cell 710 includes a L-PUF device 600 as shown in FIG. 6. Further, the L-PUF array 700 has N' sense amplifiers 740, with each sense amplifier 740 being provided to correspond to one column of the L-PUF cells 710. For clarity purposes, the M rows are labeled as row <0> to row <M−1>, and the N' columns are labeled as column <0> to column <N'−1>, similar to the labels as shown in FIG. 5.

In addition, the L-PUF array includes (M+1) input signal lines 720 and 722, and (N'×2) output signal lines 730 and 732. The input signal lines 720 and 722 respectively extend along a row direction, and the input signal lines 720 and 722 are electrically connected to the L-PUF cells 710 correspondingly. Specifically, the (M+1) input signal lines include a first input line 720, which extends along the row direction and electrically connected to the sense amplifiers 740 correspondingly, and M second input lines 722, which respectively extend along the row direction and electrically connected to the L-PUF cells 710 correspondingly. The first input line 720 is used to transmit the input signal SE from the control circuit 750 to the sense amplifiers 740. In other words, only one control circuit 750 and one first input line 720 may be required. The control circuit further includes a self-timed readout driver 100 as shown in FIG. 1 to generate the corresponding input signal SE for the sense amplifiers 740. On the other hand, each second input line 722 is used to transmit the input signal WL to the first corresponding set of the L-PUF cells 710. For example, in the first row <0>, the corresponding second input line 722 is used to transmit the input signal WL<0> to the first row <0> of the L-PUF cells 710. Similarly, in the M-th row <M−1>, the corresponding second input line 722 is used to transmit the input signal WL<M−1> to the M-th row <M−1> of the L-PUF cells 710.

The output signal lines 730 and 732 respectively extend along a column direction, and the output signal lines 730 and 732 are electrically connected to the L-PUF cells 710 correspondingly. Specifically, the (N'×2) output signal lines include N' first output lines 730, which respectively extend along the column direction and electrically connected to the L-PUF cells 710 correspondingly, and N' second output lines 732, which respectively extend along the column direction and electrically connected to the L-PUF cells 710 correspondingly. Each first output line 730 is used to transmit the first intermediate output signal BL from the second corresponding set of the L-PUF cells 710 to the corresponding sense amplifier 740, and each second output line 732 is used to transmit the second intermediate output signal BLB from the second corresponding set of the L-PUF cells 710 to the corresponding sense amplifier 740. For example, in the first column <0>, the corresponding first output line 730 is used to transmit the first intermediate output signal BL<0> from the first column <0> of the L-PUF cells 710 to the corresponding sense amplifier 740 in the same first column <0>, and the corresponding second output line 732 is used to transmit the second intermediate output signal BLB<0> from the first column <0> of the L-PUF cells 710 to the corresponding sense amplifier 740 in the same first column <0>. Similarly, in the N'-th column <N'−1>, the corresponding first output line 730 is used to transmit the first intermediate output signal BL<N'−1> from the N'-th column <N'−1> of the L-PUF cells 710 to the corresponding sense amplifier 740 in the same N'-th column <N'−1>, and the corresponding second output line 732 is used to transmit the second intermediate output signal BLB<N'−1> to the N'-th column <N'−1> of the L-PUF cells 710 to the corresponding sense amplifier 740 in the same N'-th column <N'−1>. As shown in FIG. 7, the first output lines 730 and the second output lines 732 are alternately disposed along the row direction.

The sense amplifier 740 in each column receives the corresponding first intermediate output signal BL and the corresponding second intermediate output signal BLB, and then amplifies the voltage difference generated by the two leakage devices and outputs the corresponding output signals. For example, as shown in FIG. 7, the sense amplifier 740 in the first column <0> generates an output signal OUT<0>, and the sense amplifier 740 in the N'-th column <N'−1> generates an output signal OUT<N'−1>. Further, each sense amplifier 740 is connected to a buffer B to avoid output loading difference from the peripheral circuits.

Figure 8:
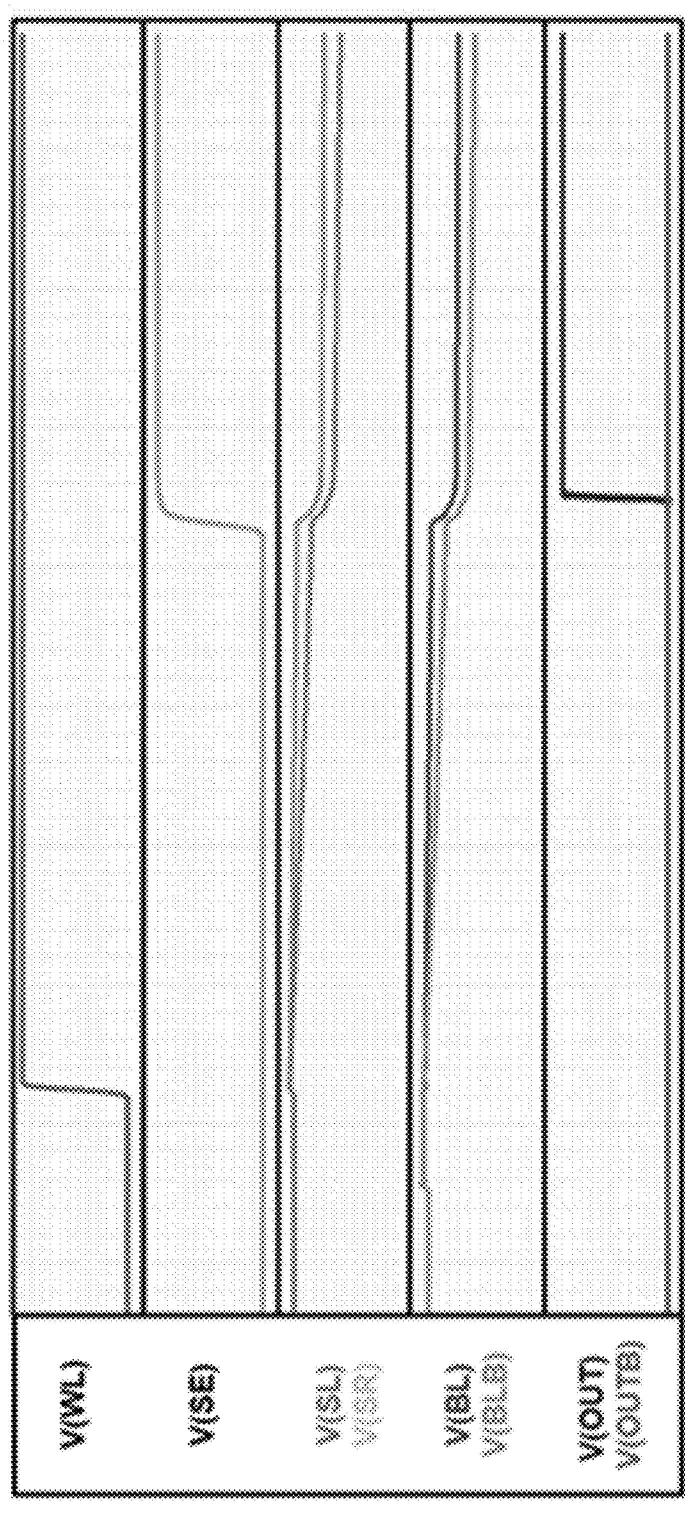
FIG. 8 shows an operation of the exemplary L-PUF array as shown in FIG. 7.

FIG. 8 shows an operation of the exemplary L-PUF array as shown in FIG. 7. Specifically, the operation as shown in FIG. 8 is similar to the operation as shown in FIG. 4, except that the intermediate output signals BL and BLB in FIG. 8 are used as the inputs of the sense amplifiers. As shown in FIG. 8, at the start of the operation process of the L-PUF array 700, for a specific L-PUF cell 710, the precharge circuit 610, which receives the input signal WL as its input, starts the pre-charging process with the input signal WL at a low voltage level, and pre-charges the nodes SL and SR to a high voltage level. Meanwhile, the precharge transistor 110 of the self-timed readout driver 100 also receives the input signal PCH, and is also precharged. At this time, the input signal SE for the sense amplifier 740 remains deactivated at the low voltage level.

Subsequently, the input signal WL signal is activated (i.e., at a high voltage level) to disable the precharge circuit 610 of the L-PUF cell 710. Meanwhile, the input signal PCH to the precharge transistor 110 allows the self-timed readout driver 100 to transition into a self-timed mode of operation. In particular, at the self-timed readout driver 100, the presence of N replicas in the leaky device Q0 allows it to leak faster than the leaky devices Q1 and Q2 in the L-PUF device 600 of the L-PUF cell 710, ensuring a quicker discharge of the SE signal by the inverter 120. The high-skewed inverter 120 then responds rapidly to the voltage drop and pulls up the SE signal. At the L-PUF device 600 of the L-PUF cell 710, with the input signal WL being activated, at the same time, the two switches S1 and S2 of the L-PUF cell 710 are turned to the ON state, such that the nodes SL and SR are respectively connected to the output ends of the two switches S1 and S2 to output the first intermediate output signal BL and the second intermediate output signal BLB. Meanwhile, with the two nodes SL and SR reaching the high voltage level, the two leaky devices Q1 and Q2 start functioning, with the leakage current of one of the two leaky devices being greater than the leakage current of the other leaky device. For example, as shown in FIG. 8, the leakage current of the first leaky device Q1 is greater than the leakage current of the second leaky device Q2, and the voltage on the node SL, which is connected to the first end of the transistor of the first leaky device Q1, will decrease faster than the voltage on the node SR, which is connected to the first end of the transistor of the second leaky device Q2. This difference in voltage drop is a result of the inherent variability of the manufacturing process, which makes it impossible to precisely replicate the same design from one chip to another. Once this voltage difference between the two leaky devices Q2 and Q1 exceeds a certain threshold (i.e., $V_{diff}$), the intermediate output signals BL and BLB will be transmitted to the corresponding sense amplifier 740, allowing the two output signals (OUT, OUTB) to be read out as (1, 0).

Figure 9:
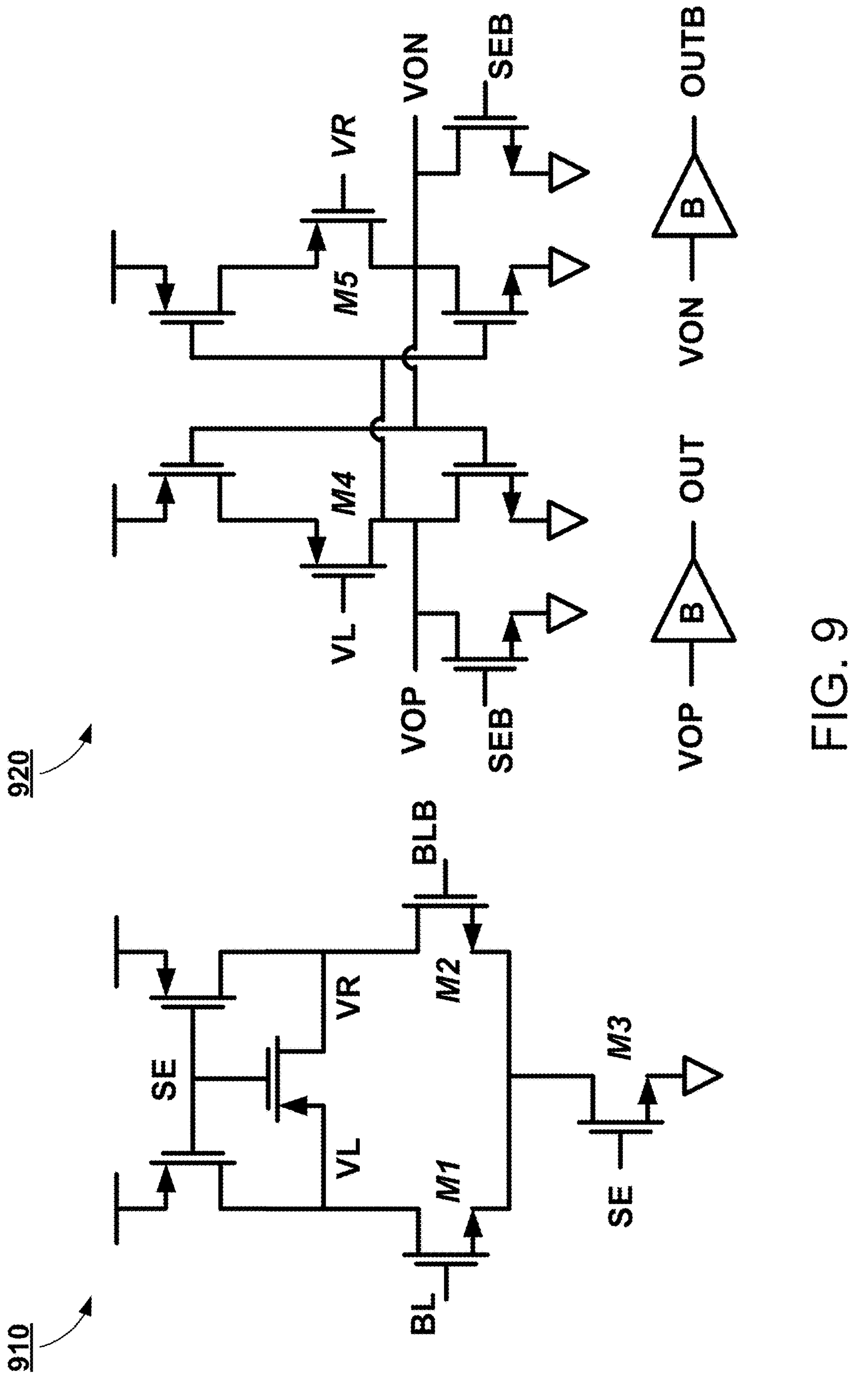
FIG. 9 shows schematically an exemplary sense amplifier used in the exemplary L-PUF array as shown in FIG. 7.

FIG. 9 shows schematically an exemplary sense amplifier used in the exemplary L-PUF array as shown in FIG. 7. Specifically, the sense amplifier as shown in FIG. 9 is a two-stage dynamic sense amplifier, which includes a first stage pre-amplifier 910 and a second stage latch 920. Each of the first stage pre-amplifier 910 and the second stage latch 920 are implemented by a plurality of transistors or diodes. The first stage pre-amplifier 910 is used to provide first stage voltage equalization, with the first intermediate output signal BL and the second intermediate output signal BLB as its input, thus reducing the offset error from the second stage latch 920. The first stage pre-amplifier 910 generates two voltages VL and VR, which are provided to the second stage latch 920 to generate the output signals VOP and VON. The output ends of the second stage latch 920 may be respectively connected with buffers.

Referring back to FIG. 7, the input signal lines 720 and 722 extend along the row direction, and the output signal lines 730 and 732 extend along the column direction. Alternatively, in certain embodiments, the structures of the signal lines may be transversed, such that the input signal lines 720 and 722 extend along the column direction, and the output signal lines 730 and 732 extend along the row direction.

In certain embodiments, with the self-timed readout driver 100, the system may transition into a self-timed mode of operation. After the input signal PCH/WL is enabled for a while, the self-timed readout driver 100 may be self-activated to generate the SE signal, therefore activating the sense amplifiers in the L-PUF cells.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A self-timed readout driver for a leakage-based physical unclonable function (L-PUF) device, the self-timed readout driver comprising:

a precharge transistor having a control end, a first end and a second end;

an inverter electrically connected to the second end of the precharge transistor; and a leaky device having a control end electrically connected to ground, a first end electrically connected to the second end of the precharge transistor, and a second end electrically connected to ground;

wherein the control end of the precharge transistor is configured to receive an input signal, and the inverter is configured to generate a sense enable (SE) signal.

2. The self-timed readout driver of claim 1, wherein the input signal and the SE signal are configured as two input signals for the L-PUF device.

3. The self-timed readout driver of claim 1, wherein the L-PUF device comprises:

a precharge circuit configured to receive the input signal;

a first leaky device and a second leaky device, electrically connected to the precharge circuit respectively, wherein each of the first leaky device and the second leaky device includes a transistor having a control end electrically connected to ground, a first end electrically connected to the precharge circuit and a second end electrically connected to ground; and a sense amplifier electrically connected to the first end of the first leaky device and the first end of the second leaky device, wherein the sense amplifier is configured to receive the SE signal and to generate a first output signal and a second output signal;

wherein the sense amplifier is configured to switch between a first state and a second state based on a voltage difference between the first leaky device and the second leaky device, and the voltage difference between the first leaky device and the second leaky device is determined by a leakage current of the first leaky device and a leakage current of the second leaky device.

4. The self-timed readout driver of claim 3, wherein the leaky device is a N-repeated leaky device, and the N-repeated leaky device is configured to leak faster than the first leaky device and the second leaky device of the L-PUF device.

5. The self-timed readout driver of claim 3, wherein the sense amplifier comprises:

a first transistor having a control end configured to receive the SE input signal, a first end, and a second end electrically connected to ground;

a second transistor having a control end electrically connected to the first end of the transistor of the first leaky device, a first end, and a second end configured to generate the first output signal;

a third transistor having a control end electrically connected to the first end of the transistor of the first leaky device, a first end electrically connected to the second end of the second transistor, and a second end electrically connected to the first end of the first transistor;

a fourth transistor having a control end electrically connected to the first end of the transistor of the second leaky device, a first end, and a second end configured to generate the second output signal; and a fifth transistor having a control end electrically connected to the first end of the transistor of the second leaky device, a first end electrically connected to the second end of the fourth transistor, and a second end electrically connected to the first end of the first transistor;

wherein the second end of the second transistor and the first end of the third transistor are electrically connected to the first end of the transistor of the second leaky device, and the second end of the fourth transistor and the first end of the fifth transistor are electrically connected to the first end of the transistor of the first leaky device.

6. The self-timed readout driver of claim 5, wherein the L-PUF device further comprises:

a first switch electrically connected to the second end of the second transistor; and a second switch electrically connected to the second end of the fourth transistor.

7. The self-timed readout driver of claim 6, wherein the first switch and the second switch are respectively controlled by the input signal.

8. An L-PUF array, comprising:

a plurality of L-PUF cells in an array, wherein each of the L-PUF cells comprises a respective L-PUF device;

a plurality of input signal lines, respectively extending along a first direction and electrically connected to the L-PUF cells correspondingly, wherein each of the input signal lines is configured to transmit one of two input signals to a first corresponding set of the L-PUF cells;

a plurality of output signal lines, respectively extending along a second direction and electrically connected to the L-PUF cells correspondingly, wherein each of the output signal lines is configured to receive output signals from a second corresponding set of the L-PUF cells; and a plurality of control circuits, electrically connected to the input signal lines to provide the two input signals to the L-PUF cells through the input signal lines;

wherein each of the control circuits includes the self-timed readout driver of claim 3, and the input signal and the SE signal generated by the self-timed readout driver are configured as the two input signals for the L-PUF cells.

9. The L-PUF array of claim 8, wherein one of the first direction and the second direction is a row direction, and the other of the first direction and the second direction is a column direction.

10. A secure authentication device including the L-PUF array of claim 8.

11. The secure authentication device of claim 10, being a secure cryptographic key generation device.

12. The self-timed readout driver of claim 1, wherein the L-PUF device comprises:

a precharge circuit; and a first leaky device and a second leaky device, electrically connected to the precharge circuit respectively, wherein each of the first leaky device and the second leaky device includes a transistor having a control end electrically connected to ground, a first end electrically connected to the precharge circuit and a second end electrically connected to ground;

wherein a first intermediate output signal is determined based on a decreased voltage of the first leaky device, and a second intermediate output signal is determined based on a decreased voltage of the second leaky device.

13. The self-timed readout driver of claim 12, wherein the leaky device is a N-repeated leaky device, and the N-repeated leaky device is configured to leak faster than the first leaky device and the second leaky device of the L-PUF device.

14. The self-timed readout driver of claim 12, wherein the L-PUF device further comprises:

a first switch electrically connected to the first end of the transistor of the first leaky device; and a second switch electrically connected to the first end of the transistor of the second leaky device;

wherein the first switch, when controlled to switch to an ON state, is configured to transmit the first intermediate output signal, and the second switch, when controlled to switch to an ON state, is configured to transmit the second intermediate output signal.

15. An L-PUF array, comprising:

a plurality of L-PUF cells in an array, wherein each of the L-PUF cells comprises a respective L-PUF device;

a plurality of input signal lines, respectively extending along a first direction and electrically connected to the L-PUF cells correspondingly;

a plurality of output signal lines, respectively extending along a second direction and electrically connected to the L-PUF cells correspondingly;

a plurality of sense amplifiers, electrically connected to one of the input signal lines and the output signal lines respectively, wherein the input signal lines are configured to transmit two input signals to the sense amplifiers and the L-PUF cells; and a control circuit, electrically connected to the one of the input signal lines to provide one of the two input signals to the sense amplifiers through the one of the input signal lines, wherein the control circuit includes the self-timed readout driver of claim 12, and the SE signal generated by the self-timed readout driver is configured as the one of the two input signals transmitted to the sense amplifiers.

16. The L-PUF array of claim 15, wherein each of the sense amplifiers is configured to receive the first intermediate output signal and the second intermediate output signal transmitted by the second corresponding set of the L-PUF cells through the output signal lines, and to generate an output signal based on the first intermediate output signal and the second intermediate output signal.

17. The L-PUF array of claim 15, wherein one of the first direction and the second direction is a row direction, and the other of the first direction and the second direction is a column direction.

18. The L-PUF array of claim 15, wherein each of the sense amplifiers comprises:

a first stage pre-amplifier; and a second stage latch.

19. A secure authentication device including the L-PUF array of claim 15.

20. The secure authentication device of claim 19, being a secure cryptographic key generation device.

* * * * *